Re. 25135

May 8, 1956　　　　E. F. KURTH　　　　2,744,919

PRODUCING PURE DIHYDROQUERCETIN

Filed Sept. 9, 1952

---

DIHYDROQUERCETIN CONTAINING TANNINS AND SIMILAR IMPURITIES

↓

DISSOLVE IN HOT AQUEOUS SOLVENT CONTAINING FROM ABOUT 0.1% BY WEIGHT TO A SOLVENT-SATURATING AMOUNT, PREFERABLY FROM ABOUT 0.5% TO ABOUT 10% BY WEIGHT, OF AMMONIUM SULFITE OR AN ALKALI METAL SULFITE

↓

COOL AND FILTER

↓

CRYSTALLINE DIHYDROQUERCETIN

↓

RECRYSTALLIZE FROM DILUTE ACID AND FILTER

↓

SULFITE-FREE DIHYDROQUERCETIN

↓

RECRYSTALLIZE FROM HOT WATER AND FILTER

↓

PURE, CRYSTALLINE DIHYDROQUERCETIN

---

*INVENTOR.*
ERVIN F. KURTH

BY *Eugene D. Farley*

ATTY.

United States Patent Office 2,744,919
Patented May 8, 1956

2,744,919
PRODUCING PURE DIHYDROQUERCETIN

Ervin F. Kurth, Corvallis, Oreg., assignor to the State of Oregon, acting by and through the Oregon State Board of Forestry Application September 9, 1952, Serial No. 308,676

10 Claims. (Cl. 260—345.2)

The present invention relates to a process for producing pure, crystalline dihydroquercetin rapidly and in high yields.

Dihydroquercetin, or 3,5,7,3',4'-pentahydroxy-4-oxy-2 phenyl chroman has the following structural formula:

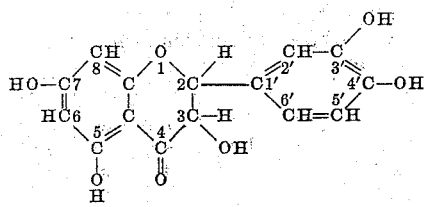

Although it heretofore has been a rare and costly chemical, it has several proved and important commercial applications. It is, for example, an effective antioxidant and being non-toxic, may be used as an antioxidant in vegetable and animal fats and oils intended for human consumption. Also, together with its derivatives, it has medicinal qualities making it useful in pharmaceutical preparations. Still further, since it has in its structure several reactive functional groups, it is of value as the starting material for numerous organic chemicals of potential commercial importance. One of these is quercetin itself, or the dehydro derivative of dihydroquercetin.

It recently has been discovered that dihydroquercetin is an important constituent of the bark of certain species of trees, notably Douglas fir and Jeffrey pine, in which it is contained in amounts of as much as 7% by weight. Since many tons of this bark are produced annually as a by-product of the logging and lumber industries, there is available a potential source of a very large quantity of dihydroquercetin.

Furthermore, the dihydroquercetin, at least in crude form, is readily separable from the bark. All that is required is to extract the bark with a selective solvent for the dihydroquercetin, the most readily available of such solvents being water. As is well known, however, water will dissolve from the bark a substantial amount of sugars, tannins and related materials together with the dihydroquercetin, and as a result there is obtained a complex aqueous mixture of these various classes of materials.

Unfortunately, dihydroquercetin is difficult to separate in its pure crystalline form from an aqueous solution of tannin. Since both of these substances are soluble in water, concentration of an aqueous solution containing them results in the production of a thick syrup and not in the desired selective precipitation of crystalline dihydroquercetin. Also, if these materials are dissolved in hot water and the resulting hot aqueous solution cooled, there again is little or no precipitation of dihydroquercetin. Furthermore, even when the dihydroquercetin contains only a small proportion of tannin as an impurity, the tannin appears to disperse the dihydroquercetin in aqueous solution. Hence, if it is attempted to crystallize it from water, the dihydroquercetin crystallizes slowly and the yield of crystalline product, if any at all is obtained, is very small.

I now have discovered that the foregoing difficulties may be resolved and dihydroquercetin separated in relatively high yields and in a pure crystalline condition from tannin-containing aqueous solutions by the simple expedient of introducing into the solution a minor proportion of ammonium sulfite or of an alkali metal sulfite. When this is done, white crystals of dihydroquercetin rapidly settle out of the solution, leaving the tannin and related materials behind. The dihydroquercetin product then may be removed by filtration or other suitable means and re-crystallized to free it from traces of the sulfite compound, if this is desirable for given applications.

The presently described process for producing pure dihydroquercetin will be apparent from a consideration of the drawing comprising a flow plan of the process. As is illustrated in the drawing and as has been stated hereinabove, the starting material comprises dihydroquercetin containing tannin and similar impurities, by which is meant impurities having a similar molecular structure, a similar source, or similar solubility characteristics. It is contemplated primarily that the dihydroquercetin which is the subject matter of the herein described purifying procedure shall be derived from the extraction of the bark of the Douglas fir and other trees with water or other solvents for dihydroquercetin, such as the lower aliphatic ketones, ethers, and alcohols.

The extraction of the bark may be effectuated in any suitable manner as by grinding or otherwise comminuting the bark and subjecting it to the action of a hot, aqueous solvent, either batchwise or in a continuous system. The resulting solution of dihydroquercetin containing some tannin and other contaminants then is separated from the bark residue. Next the solution may be cooled and filtered, decanted or centrifuged for removal of phlobaphenes and other cold water insolubles. Thereafter it may be evaporated for removal of the solvent, leaving a syrupy or solid residue comprising dihydroquercetin contaminated with tannins, sugars, colored bodies and other impurities derived from the bark.

The crude dihydroquercetin then may be extracted with a solvent such as a lower aliphatic (less than ten carbon atoms) alcohol, ketone, or ether to separate a portion of the tannins, sugars and colored substances (insoluble). Next it is crystallized from a hot aqueous solution containing at least one member of the group consisting of ammonium sulfite and the alkali metal sulfites. Thus there may be employed ammonium sulfite, sodium sulfite, potassium sulfite, or the sulfites of lithium, rubidium, and caesium, although the latter obviously are of subordinate commercial significance. The foregoing reagents may be employed singly or in admixture with each other. Of the group, sodium sulfite is a preferred member because of its low cost, availability, and effective action.

A relatively small amount of sulfite compound is necessary to effectuate the presently described process, as little as 0.1% by weight exhibiting a noticeable effect. The upper limit of sulfite usage is the amount required to saturate the solution at the crystallizing temperature. A preferred range is from about 0.5% to about 10% by weight of sulfite. Within this range the dihydroquercetin is precipitated rapidly while the tannins are retained in solution.

The crystallization procedure may be carried out in any suitable manner, as by forming a hot aqueous solution of the crude dihydroquercetin and sulfite compound and cooling until the dihydroquercetin has precipitated. For example, to a quantity of the impure dihydroquercetin there may be added sufficient hot water, i. e. water at or near the boiling point, to dissolve it. Then to the resulting solution there may be added the predetermined amount of sulfite compound after which the mixture may be cooled with stirring until the dihydroquercetin precipitates. Alternatively, however, the sulfite compound may be dissolved in the aqueous solvent which thereafter may be mixed with the crude dihydroquercetin.

As used herein the term "aqueous solvent" is intended primarily to comprise water. If desirable or necessary, however, there may be added minor but effective proportions of water soluble liquids such as alcohol, which may in certain instances have a desirable effect in retaining the impurities in solution.

The hot aqueous solution of dihydroquercetin and sulfite compound is cooled and permitted to stand until the dihydroquercetin has precipitated substantially completely. The product then may be removed from the crystallizing liquor in any suitable manner, as by filtering, decanting, or centrifuging. It is a white crystalline material which may form as a hydrate and which may have a small amount of sulfite compound adsorbed on the surfaces of the crystals, or contained in the water of hydration. This may be removed by recrystallizing from hot water, or preferably, from a hot aqueous solution of a mineral or organic acid.

Suitable mineral acids which may be employed for this purpose include sulfuric acid, hydrochloric acid, phosphoric acid and the like, while suitable organic acids include acetic acid, formic acid, propionic acid, oxalic acid and the like. These are employed in amount sufficient to impart acidity to the aqueous recrystallization medium and thereby to neutralize or decompose the contaminating sulfite compounds, but insufficient to decompose the dihydroquercetin. Thus preferred acid reagents for effectuating the recrystallization of the dihydroquercetin and the removal of any sulfite contaminant therefrom, where such removal is desirable or necessary, comprise dilute sulfuric acid or dilute hydrochloric acid, having a concentration of not more than about 20%, preferably between about 0.1% and about 5.0% by weight.

The recrystallization procedure may be carried out by dissolving the dihydroquercetin in sufficient hot water or dilute acid to dissolve it and thereafter cooling the solution with stirring. Thereupon the dihydroquercetin separates out in the form of white crystals which may be removed from the mother liquor by filtration or other suitable method.

Since the dihydroquercetin obtained in the foregoing manner may be contaminated with a trace of acid derived from the acid recrystallizing medium, which may render it unsuitable or undesirable for certain applications, it may be further recrystallized for removal of this contaminant. In this case, the recrystallizing medium may be water which may or may not contain a little decolorizing charcoal, the dihydroquercetin being dissolved in the water at near its boiling point, e. g. at a temperature of about 90° C. The resulting aqueous solution then may be filtered to remove the charcoal and cooled to precipitate the dihydroquercetin as a crystalline compound, the precipitation being complete substantially as soon as the solution is cold. Thereafter the dihydroquercetin may be filtered or otherwise separated from the crystallizing medium and dried.

The dihydroquercetin produced from the foregoing procedure not only is obtained in the form of a pure crystalline compound melting sharply at 246–247° C., but also is obtained much more rapidly and in much higher yields than when the presently described procedure is not employed. Thus the crystallization from the sulfite solution described above may be carried out in a matter of a few minutes, as opposed to a period of several hours, or even, in an extreme case, of several days, when the sulfite solution is not employed. Also, a crystalline dihydroquercetin product is obtained from the practice of a one-step process, or at most of a three-step process if the product must be completely free of all traces of sulfite compound and acid. This is in sharp contrast to a procedure requiring at least four or five recrystallizing steps in order to obtain a relatively small yield of dihydroquercetin when the sulfite compound is not employed. Furthermore, a substantially complete recovery of the dihydroquercetin is obtained, as opposed to little, or even no recovery, if the sulfite compound is not included in the crystallization medium. These aspects of the process obviously greatly enhance its commercial application.

The process of the present invention is illustrated by the following examples wherein parts are expressed as parts by weight.

*Example I*

5 parts of impure dihydroquercetin containing a substantial proportion of tannin and derived from the extraction with hot water of Douglas fir bark cork fraction were dissolved in 100 parts by weight of a 4% solution of sodium sulfite at a temperature of 100° C. After the solution had cooled to room temperature, the dihydroquercetin had separated substantially completely in the form of a white, crystalline product.

In a manner similar to the foregoing pure dihydroquercetin is prepared using ammonium sulfite or potassium sulfite in place of the sodium sulfite employed in the outlined procedure.

*Example II*

The foregoing procedure was repeated using as the raw material crude dihydroquercetin obtained as the total ether extract from the concentrated hot water extract of Douglas fir bark. To 5 parts of this material there were added 100 parts of a 2% sodium sulfite solution at a temperature of 100° C., after which the solution was permitted to cool. After it had cooled to room temperature it was filtered, yielding 86% of white, crystalline dihydroquercetin.

*Example III*

The procedure of Example I was followed except that the dihydroquercetin product was dissolved in hot water acidified with dilute sulfuric acid. Thereafter the solution was cooled, yielding sulfite-free crystals of dihydroquercetin. These were removed by filtration and dried. Upon being heated they melted at 241–242° C.

The crystalline product obtained in the above manner was dissolved in hot water and crystallized from that medium. As a product there was obtained sulfite- and acid-free crystalline dihydroquercetin melting at 247–248° C.

It thus will be apparent that by the present invention I have provided a process for separating pure dihydroquercetin from impurities comprising tannin and other substances obtained from the same source as dihydroquercetin and having similar solubility behavior. Not only is the dihydroquercetin obtained in a pure condition by a relatively simple process, but it is obtained rapidly and in high yields. These factors contribute in a substantial degree to making dihydroquercetin, heretofore a rare and costly chemical, one which is abundant, relatively inexpensive, and of great commercial potentialities.

Having thus described my invention in preferred embodiments, I claim:

1. The process of separating dihydroquercetin from crude dihydroquercetin containing tannins and like impurities derived from bark, which comprises crystallizing the dhydroquercetin from an aqueous solution containing from about 0.5% to about 10% by weight of sodium sulfite.

2. The process of separating dihydroquercetin from crude dihydroquercetin containing tannins and like impurities derived from bark, which comprises crystallizing the dihydroquercetin from an aqueous solution containing from about 0.5% to about 10% by weight ammonium sulfite.

3. The process of producing dihydroquercetin from crude dihydroquercetin containing tannins and like impurities derived from bark, which comprises crystallizing the dihydroquercetin from an aqueous solution containing from about 0.5% to about 10% by weight potassium sulfite.

4. The process of separating dihydroquercetin from crude dihydroquercetin containing tannins and like impurities derived from the bark of trees, which comprises dissolving the crude dihydroquercetin in a hot aqueous solvent containing from about 0.1% by weight to a solvent-saturating amount of at least one member of the group consisting of ammonium sulfite and the alkali metal sulfites, and cooling the resulting solution to substantially atmospheric temperature, thereby crystallizing the dihydroquercetin from the solution while retaining the tannins and other impurities therein, and thereafter separating the dihydroquercetin from the crystallizing medium.

5. The process of producing dihydroquercetin from crude dihydroquercetin containing tannins and like impurities derived from bark, which comprises crystallizing the dihydroquercetin from an aqueous solution containing from about 0.1% by weight to a solvent-saturating amount of at least one sulfite compound of the class consisting of ammonium sulfite and the alkali metal sulfites, removing the crystalline dihydroquercetin from the crystallizing medium, and thereafter recrystallizing the dihydroquercetin from an aqueous acid solution, thereby forming a dihydroquercetin product which is free from sulfite contaminants.

6. The process of producing dihydroquercetin from crude dihydroquercetin containing tannins and like impurities derived from bark, which comprises crystallizing the dihydroquercetin from an aqueous solution containing from about 0.1% by weight to a solvent-saturating amount of at least one sulfite compound of the class consisting of ammonium sulfite and the alkali metal sulfites, removing the crystalline dihydroquercetin from the crystallizing medium, thereafter recrystallizing the dihydroquercetin from an aqueous acid solution, thereby forming a dihydroquercetin product which is free from sulfite contaminants, and recrystallizing the sulfite-free dihydroquercetin product from water, thereby producing a sulfite-free, acid-free dihydroquercetin product.

7. The process of producing crystalline dihydroquercetin which comprises extracting dihydroquercetin-containing tree bark with a hot aqueous solvent, separating the resulting solution of dihydroquercetin and tannin from the bark residue, cooling the said solution for precipitating phlobaphenes therefrom, separating the solid phlobaphenes from the solution, concentrating the solution, extracting the resulting concentrate with a solvent comprising at least one member of the group consisting of the lower aliphatic alcohols, ketones, and ethers, dissolving the resulting dihydroquercetin-containing extract in hot water containing from about 0.1% by weight to about that amount required to saturate the water of at least one sulfite compound of the class consisting of ammonium sulfite and the alkali metal sulfites, and cooling the resulting solution, thereby precipitating crystalline dihydroquercetin therefrom.

8. The process of claim 7 wherein the sulfite compound is ammonium sulfite.

9. The process of claim 7 wherein the sulfite compound is sodium sulfite.

10. The process of claim 7 wherein the sulfite compound is potassium sulfite.

References Cited in the file of this patent

FOREIGN PATENTS 729,106     Germany _____ Dec. 10, 1942

OTHER REFERENCES

Kurth et al.: Chem. Abst., vol. 42, col. 7977 (1948).
Hubbard et al.; Chem. Abst., vol. 43, col. 9172 (1949).
Kurth et al.: Chem. Abst., vol. 44, col. 8681 (1950).
Kurth et al.: Chem. Abst., vol. 45, col. 10618 (1951).
Dumesny and Noyer: "Wood Products Distillates and Extracts," 2nd revised ed., Scott, Greenwood and Son, London (1921), pp. 276–81.